Oct. 7, 1947.  L. B. SMITH  2,428,640
RECIPROCATING FLUID-ACTUATED MOTOR WITH
FLUID-ACTUATED DISTRIBUTING VALVE
Filed Jan. 29, 1945  2 Sheets-Sheet 1
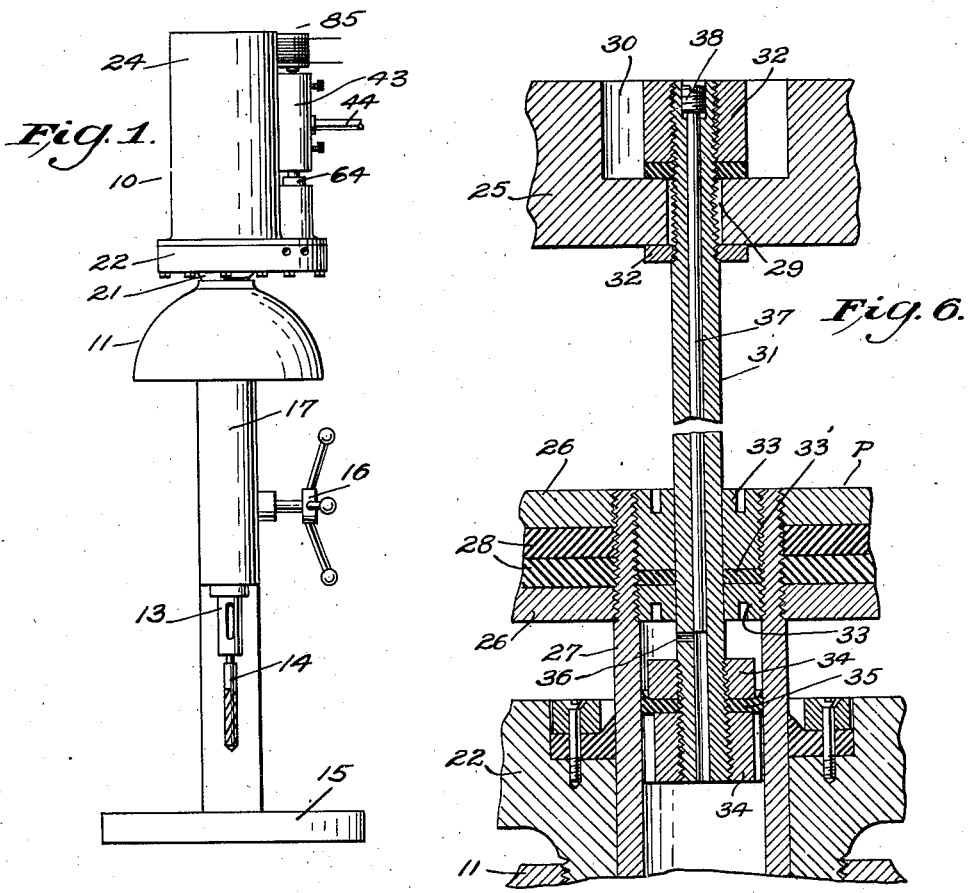
Inventor
Lafayette B. Smith
By W. S. McDowell
Attorney Oct. 7, 1947.　　　　　L. B. SMITH　　　　　2,428,640
RECIPROCATING FLUID-ACTUATED MOTOR WITH
FLUID-ACTUATED DISTRIBUTING VALVE
Filed Jan. 29, 1945　　　　2 Sheets-Sheet 2
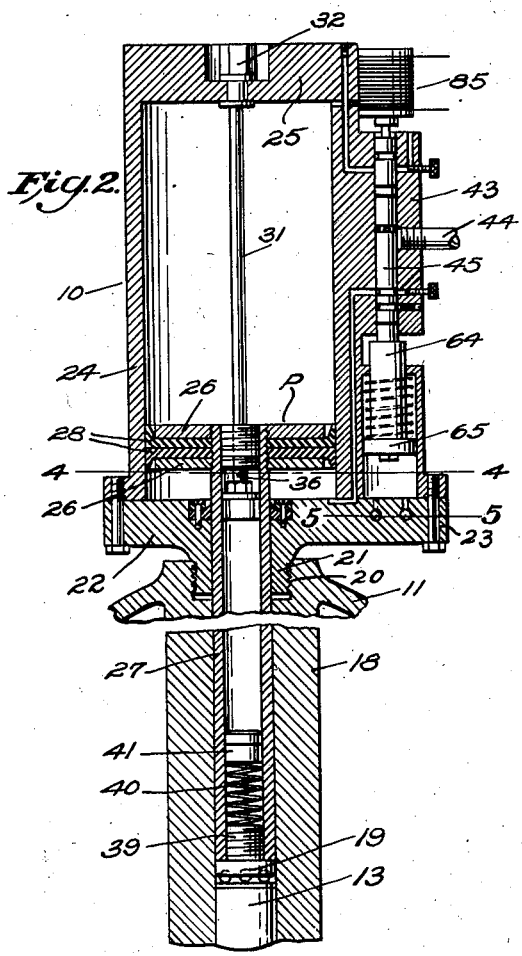
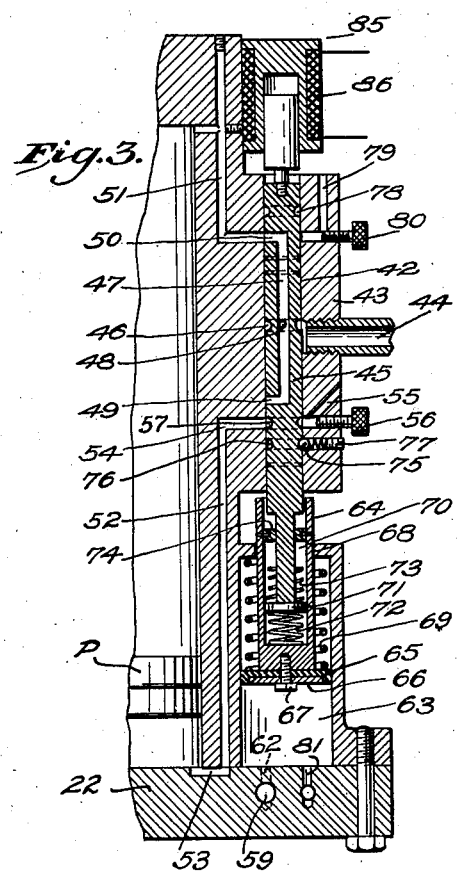
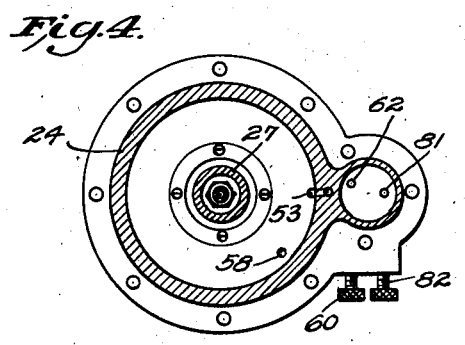
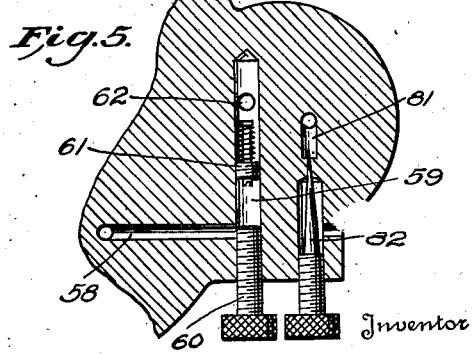
Inventor
Lafayette B. Smith
By H. H. McDowell
Attorney Patented Oct. 7, 1947

2,428,640

UNITED STATES PATENT OFFICE 2,428,640

RECIPROCATING FLUID-ACTUATED MOTOR WITH FLUID-ACTUATED DISTRIBUTING VALVE

Lafayette B. Smith, Columbus, Ohio

Application January 29, 1945, Serial No. 575,029

3 Claims. (Cl. 121—150)

This invention relates to compressed air-operated motors, and, more particularly, to fluid-actuated motors of the character involving a cylinder in which is mounted a reciprocatory piston, valved passages being provided for controlling automatically the timed admission and exhaust of air into and from the opposite ends of the cylinder in applying reciprocating energy to the piston.

While adaptable to various other fields of use, my improved compressed air motor is particularly suitable for service in controlling the automatic advance and withdrawal of the cutters or drills of machine tools into and from work undergoing machining. In drill presses particularly, as hitherto constructed, the rotating drill is advanced into the work, through the actuation of a manual control, and it frequently happens, under such manual conditions of operation, that the rate of drill advance into the work is too rapid, or the duration of the drilling period so prolonged, that undue strains are set up in the drill, causing breakage or other premature failure thereof.

It is, therefore, an object of the present invention to provide an improved compressed air operated motor for controlling automatically the movement of a metal-cutting or drilling instrumentality of a machine tool into and out of engagement with the metal undergoing machining, whereby to regulate the rate of such movement so that the tool will perform with maximum efficiency and with prolonged life on the part of its metal-cutting or drilling instrumentality.

It is another object to provide an air motor of this character with an improved reciprocatory valve mechanism for regulating the alternate admission and exhaust of the motivating fluid into and from the opposite ends of the motor cylinder, said valve mechanism being so constructed and mounted that air pressures acting thereon in opposition to spring forces produce intermittent sliding movement of the valve mechanism, whereby associated ports or passages, controlling paths of air flow, are opened or closed to govern the application of fluid pressures to the motor piston, so that its reciprocation, under controlled conditions of operation, is effected.

A further object is to provide an air motor of the character set forth with an improved fluid-displacing regulator for controlling the rate of reciprocatory travel of the cylinder-carried piston, the regulator being formed to embody a stationary tube supported by the upper end of the motor cylinder and extending axially through the latter and said piston, the lower end of the tube terminating in a head which is received in a liquid-containing barrel carried by and projecting axially below the piston, the tube, above said head, being provided with a port having its area rendered variable by a valve stem adjustably carried by the tube, the construction being such that when the piston reciprocates, liquid in said barrel is caused to pass first to one side and then the other of said head with metered flow through said port, thus providing for smooth operation on the part of the piston and a variable control over its rate of travel.

Still, a further object is to provide an air motor of simple and efficient construction, one wherein variable controls are provided for governing precisely its essential operating conditions and, further, a motor which is reliable in operation, not likely to become out of mechanical order nor necessitate undue attention or repair.

For a more detailed understanding of the invention, and other objects and advantages thereof, reference is to be had to the following description and the accompanying drawings, wherein:

Fig. 1 is a front elevational view disclosing my improved air motor when used on a drill press;

Fig. 2 is a vertical sectional view taken through the motor;

Fig. 3 is a fragmentary vertical sectional view on a somewhat enlarged scale and disclosing more particularly the valve mechanism of the motor;

Fig. 4 is a horizontal sectional view, the plane of which is disclosed by the line 4—4 of Fig. 2;

Fig. 5 is a similar view on the line 5—5 of Fig. 2;

Fig. 6 is an enlarged vertical sectional view of the hydraulic check mechanism for governing the operation of the motor piston.

Referring more particularly to the drawings, the numeral 10 designates my improved air motor in its entirety. In its present exemplary embodiment, the same has been shown as mounted on the upper end of the frame 11 of a standard drill press, the frame being provided with a power rotated, vertical movable spindle 13, the latter carrying at its lower end a drill 14 which, while being rotated, is movable vertically toward and away from the work-supporting bed 15 of the press. A spoked, manually rotatable wheel 16 of standard construction is shown as carried by the spindle housing 17 of the press and through the rotation of this wheel, the drill 14 may be raised or lowered in the usual way. However, with the use of my improved air motor, the operation of the wheel 16 is rendered unnecessary, particularly when successive drilling operations are to be performed.

The upper end of the spindle 13 is slidably mounted in a stationary tubular guide 18, the spindle being forced upwardly by the use of a standard spring construction, not shown, and downwardly by the operation of the air motor, the upper end of the spindle carrying an anti-friction thrust bearing 19. Threaded as at 20 into the upper end of the guide 18 is an axially disposed depending boss 21 projecting from the under side of a stationary lower cylinder head 22. Bolted or otherwise fastened as at 23 to the head 22 is the lower end of the motor cylinder 24, the latter being provided at the top thereof with a closed head 25.

Slidably mounted in the cylinder 24 is a piston P which, in this instance, is composed of a pair of metallic disks 26 formed with axially threaded openings for reception on the threaded upper end of a tubular shaft or barrel 27. The disks 26 confine between them a pair of compressible gaskets 28 which have wiping engagement with the inner surfaces of the cylinder 24.

As shown more particularly in Fig. 6, the upper head 25 of the cylinder is provided with an axial opening 29 and a communicating well 30 and positioned therein is the upper threaded end of a hollow tubular stem 31. The upper threaded end of the stem carries nut devices 32 by which the stem is stationarily supported in depending axial relationship to the cylinder 24. The stem also passes axially through the piston P, which is slidable with respect thereto, the upper end of the shaft or barrel 27 being internally threaded for the reception of nut devices 33 between which is clamped a compressible gasket or washer 33' and by which fluid-sealing contact with the outer wall surfaces of the stem is maintained.

The lower end of the stem 31 carries a head composed of nut devices 34 between which is clamped a compressible gasket 35 having fluid-sealing contact with the inner wall surfaces of the shaft or barrel 27. Above this head, the stem 31 is formed with a laterally extending port 36, establishing communication between the interior of the shaft or barrel 27 above the head and the internal axial bore of the stem. The effective area of this port is rendered variable by the provision of a valve rod 37, the latter being provided at its upper end with a threaded enlargement 38 positioned in the internally threaded upper end of the stem 31.

The bottom of the shaft or barrel 27 is internally threaded for the receptiton of a plug 39. Positioned on the upper end of this plug is a coil spring 40 which supports a slidable piston cup 41. Below the piston P, the interior of the barrel 27 is filled with a hydraulic fluid which is displaced as the piston reciprocates in the cylinder 24. It will be seen that the head on the lower end of the stem 31 is stationarily positioned with relation to the barrel 27, since the latter is carried by and reciprocative in unison with the piston P. Thus, when the piston ascends, the liquid below the stem head is forced upwardly through the bore in the stem to the valve rod 37 and thence outwardly through the port 36 into the chamber formed by the interior of the barrel above the stem head. The spring-pressed piston cup 41 is provided to maintain a slight pressure on the liquid and compensate for small volumes of air which may enter the barrel. Likewise, when the piston descends, the liquid above the stem head in the barrel 27 is forced through the port 36 and thence into the barrel below the stem head. By adjusting the operating positions of the valve rod 37, the effective area of the port 36 may be increased or diminished to control the rate of fluid travel therethrough, thereby increasing or decreasing the reciprocating speed of the piston. This hydraulic check mechanism provides for smooth operation on the part of the piston and the controlled rate of travel thereof. It will be noted that the check mechanism does not project above the top of the cylinder and therefore the length or height of the cylinder is not increased by the inclusion of said mechanism.

The valve mechanism employed in controlling the introduction of compressed air into and exhaust of spent air from the cylinder is mounted for sliding movement in a vertical bore 42 provided in a lateral enlargement 43 of one side of the cylinder wall. Compressed air, obtained from any suitable source of supply, is conducted to the bore 42 by means of an inlet pipe disclosed at 44. Slidably mounted in the bore 42 is a valve member 45. This member is mounted for limited reciprocating travel in the bore 42, so that an annular groove 46 formed in its outer wall will be in constant registration with the air inlet 44. Interiorly, the valve member is provided with an axially disposed passage 47, which communicates with the groove 46 by means of one or more laterally extending ports 48.

It will be seen that with the valve mechanism positioned as shown in Fig. 3, compressed air from the inlet 44 will pass through the port or ports 48 into the passage 47. The lower laterally directed end 49 of the passage 47, when the valve member is thus positioned, is closed by the wall surface of the bore 42, while the upper laterally directed end 50 of the passage 47, with the valve member positioned as in Fig. 3, registers with one end of an air-conducting passage 51 which leads to the top of the piston-receiving chamber provided in the cylinder 24. Thus compressed air will be admitted into the upper end of the cylinder chamber and applied to the piston to force the latter to travel downwardly. Such downward travel of the piston causes the shaft or barrel 27 to engage with the upper end of the spindle 13 and to move the latter downwardly, against spring resistance, to bring the drill 14 carried thereby into drilling engagement with the work supported on the drill bed 15.

After the piston has traveled downwardly to a predetermined extent, its direction of movement is reversed automatically through the operation of the valve mechanism. As the piston moves downwardly, the air in the cylinder below the same is discharged to the atmosphere by a passageway 52 formed vertically in the wall of the cylinder 24. The lower end of this passageway communicates with a short passage 53 provided in the upper surface of the lower cylinder head 22, while the upper end of the passageway 52 terminates in a horizontally and laterally directed extension 54, which intersects the bore 42. Communicating with the outer portion of the extension 54 is a diagonally extending bleed port 55, which may be opened or closed, as desired, by an adjustable screw 56. The valve member 45 is formed with an annular groove 57 providing for air flow around the same when said valve member is positioned so that the groove 57 registers with the passage extension 54, as in Fig. 3.

A passage 58, formed in the cylinder head 22, establishes communication between the lower end of the cylinder 24 and an angularly extending bore 59. The outer end of the bore 59 is threaded for the reception of the shank of an adjusting screw 60, which may be moved to cover or uncover the outer end of the passage 58 to control air flow between said passage 58 and bore 59. In order that air may flow in but one direction through the bore 59, the latter is provided with a spring pressed tire valve 61, preferably of the well-known Schrader-type. At its inner end and beyond the valve 61, the bore 59 is provided with a port 62 which establishes communication between the bore 59 and a cylinder chamber 63 formed in the lower part of the cylinder enlargement 43.

Mounted for reciprocation in the chamber 63 is a tubular piston element 64 which, at its lower end, carries a gasket washer 65 having wiping engagement with the walls of the chamber 63, the gasket 65 being retained in place on the lower end of the element 64 by means of a metallic washer 66 and a screw 67. The upper portion of the piston element 64 projects through an opening 68 provided in the upper end of the chamber 63. Between the washer 65 and the upper end of the chamber 63, there surrounds the piston element 64 a coil spring 69. Normally, the tendency of this spring is to force the piston element downwardly, so that air pressure must be built up in the lower part of the chamber 63 to overcome the resistance of the spring 69 in order to elevate the piston element 64.

Within the hollow interior 70 of the piston element 64, there is positioned the lower end of the valve member 45, the extreme lower end of said valve member being provided with a disk 71. A spring 72 is arranged beneath the disk 71 and the lower part of the piston element 64, and a corresponding spring 73 is positioned between the upper part of the disk 71 and a seat 74 carried by the interior of the piston element 64.

Normally, the valve member 45 is restrained against movement by the provision of a ball 75 which is seated in an annular groove 76 provided in the valve member. The ball is pressed by a spring and the compression of the latter may be adjusted by a screw 77. At its upper end, the valve member 45 is formed with another annular groove 78 which, when the valve member is lowered, is adapted to register with the passage 51, establishing communication between the latter passage and an angularly shaped bleed passage 79 leading to the atmosphere. The flow of air through the passage 79 is subject to regulation through adjustment of the valve screw shown at 80. The bottom of the chamber 63 is also provided with a bleed passage 81 which leads to the atmosphere and an adjustable needle valve 82 is positioned in the passage 81 to regulate outflow of air therethrough.

The operation of this valve mechanism may be summarized as follows: With the valve member 45 elevated and held in such elevated position by the spring pressed ball 75, compressed air enters by way of the inlet 44, passing through the valve member passage 47 to the cylinder passage 51 and thence into the upper end of the cylinder chamber, forcing the piston P downwardly. During the downward movement of the piston, air in the cylinder chamber beneath said piston is discharged to the atmosphere by way of the passages 52, 53, 54 and 55. At this time, air travel through the passage 58 and the bore 59 to the chamber 63 is arrested by the check valve 61 and air previously under pressure in the chamber 63 will have been bled off through the passage 81. The reduction of air pressure in the chamber 63 permits of the expansion of the spring 69, thus producing downward movement of the piston element 64. This downward movement compresses the upper spring 73 and when the same has ben sufficiently compressed, the energy exercised thereby is sufficient to overcome the light spring pressure on the ball 75 and with the result that the valve member 45 is forced downwardly until the ball 75 engages in the annular groove 57, thus holding the valve member against further downward movement.

Such downward movement on the part of the valve member interrupts the registration between the upper end of the passage 47 thereof and the cylinder passage 50, thereby arresting air flow under pressure to the upper end of the cylinder. However, the downward movement on the part of the valve member brings the lower end 49 of the passage 47 into registration with the upper end 54 of the passage 52, providing for air flow under pressure from the inlet 44 through passages 47, 49, 54, 52 and 53 into the lower end of the piston cylinder, producing upward movement on the part of the piston P. During such upward movement of the piston, air above the same is displaced from the cylinder and passes to the atmosphere by way of the passage 51, valve member groove 78 and the bleed passage 79.

Also, as a result of the admittance of compressed air into the lower part of the cylinder in effecting upward movement of the piston P, such air pressure will result in the unseating of the tire valve 61, providing for air flow under pressure into the cylinder chamber 63. As this pressure is built up, and the rapidity with which the build-up takes place is under the control of the valve screw 60, the piston element 64 will be forced upwardly, so that by the time the piston P reaches the upper limit of its stroke, the springs 69 and 72 will have been sufficiently depressed to overcome the light spring pressure on the ball 75, providing for the restoration of the valve member 45 to its upper position and the completion of the cycle of operation.

By adjusting the valve screws 60 and 82, the length of the piston stroke may be readily controlled, and its linear speed of drill advance and retraction by the screw valves 56 and 89. Further regulation of the linear speed of the piston is accomplished by adjustment of the hydraulic valve check 37. All these adjustments may be conveniently made by the machine operator in order that optimum operating conditions may be established.

The motor is particularly advantageous when employed on a drill press, as it permits of such positive, easy and regulated movement of the drill into the work that drill breakage is precluded. It will be noted that drill advance into the work takes place for a definite in-feeding stroke of regulable duration, after which the drill is lifted from the bore as produced in the work to discharge shavings. The operation of the drill is thus under such uniform control that it is possible to drill bores possessing a length many times greater than the diameter thereof. Since the operation of the drill press equipped with my improved air motor is virtually automatic, one operator may supervise the operation of several presses and, furthermore, the services of a highly skilled mechanic are rendered unnecessary.

If desired, the upper end of the valve member may be provided with a solenoid armature 85 which is slidably mounted in the field winding 86 of the solenoid. By an appropriate switch mechanism, not shown, the solenoid may be excited to move the valve member in one direction against the resistance of the spring 73 and the ball check 75. The use of this solenoid construction, however, is optional, although in certain drill press operations, its employment has been found to be advantageous.

It will be understood that the invention is subject to further modification without departing necessarily from the scope of the following claims.

Having thus described my invention, I claim:

1. In an air motor, a cylinder, a piston mounted for reciprocation in said cylinder, a valve housing associated with said cylinder having a bore, a cylindrical valve member slidably mounted in said bore, said valve member being formed with an axial passage communicating at its ends with the exterior of said valve member, air inlet means entering said valve housing and communicating with said bore, said valve member being provided with a port situated to register with said inlet means in all operating positions of the valve member, said port providing for air flow into said passage, said cylinder being formed with oppositely extending air passageways, one of said passageways leading to one end of said cylinder on one side of said piston and the other of said passageways leading to the other end of said cylinder on the other side of said piston, the opposite ends of said passageways terminating in spaced relation at said bore, valve regulated bleed ports in said housing disposed in registration with the terminating ends of said passageways at said bore, said bleed ports leading to the atmosphere, said bleed ports being situated to register alternately with annular grooves formed in said valve member to provide for the discharge of air to the atmosphere by way of said passageways from the side of said piston opposed to that receiving energy, means for retaining said valve member against movement in its extreme operating positions of adjustment, spring means normally serving to maintain said valve member in one of its extreme positions of adjustment, and means operated by air pressure for overcoming the effect of said spring means and for moving said valve member to its other extreme operating position.

2. In an air motor, a cylinder, a piston mounted for reciprocation in said cylinder, a valve housing formed with and arranged at one side of said cylinder, said housing being provided with a valve bore and a longitudinally registering cylinder chamber, a cylindrical valve member slidably mounted in said bore, said valve member being formed with a longitudinally and axially disposed passage communicating at its ends with the exterior of the valve member, air inlet means entering said valve housing and communicating with said bore, said valve member being provided with a port situated to register with said air inlet means in all operating positions of sliding adjustment of said valve member, said port providing for air flow into said passage, said cylinder being formed with oppositely extending air passageways entering said bore at spaced positions and extending to the opposite ends of said cylinder, said passageways being adapted for alternate registration with the ends of the axial passage of said valve member, said valve housing being provided with air-discharging ports having their inner ends communicating with said bore in registration with the corresponding ends of said passageways and their opposite ends leading to the atmosphere, adjustable valve devices for regulating air flow through said air discharging ports, said valve member being provided with annular grooves adapted for alternate registration with said passageways and air-discharging ports, a piston element slidably mounted in said cylinder chamber, spring means cooperative with said piston element and tending to slide the same in one direction in said chamber, said piston element being formed with an internal chamber for the reception of one end of said valve member, a washer element carried by the end of said valve member disposed in said piston element chamber, opposed springs arranged on opposite sides of said washer element and disposed in the piston element chamber, means operative during the advance of said piston in one direction to admit air under pressure into said cylinder chamber to oppose the tendency of the springs therein to advance said valve member in one direction, the said cylinder chamber having an outlet port leading to the atmosphere, a valve for regulating air flow through said last-named port, and means for retaining said valve member against sliding movement until overcome by the force of the spring means in said cylinder chamber and the air pressures developed therein.

3. In an air motor, a cylinder, a piston mounted for reciprocation in said cylinder, said cylinder being provided at one side with a valve enlargement having a longitudinally extending bore, a cylindrical valve member mounted for limited sliding movement in said bore, said valve member being formed with an axial passageway communicating at its ends with the exterior of said valve member, air inlet means entering said enlargement and communicating with said bore, said valve member being provided with a port situated to register with said air inlet means in all positions of sliding adjustment of the valve member, said port providing for air flow into said passage, said cylinder being formed with oppositely extending air passageways having spaced inner ends disposed for alternate registration with the ends of the axial valve member passage, said passageways extending to the opposite ends of said cylinder, said enlargement being formed with air-discharging ports leading from said port in registration with the inner ends of said passageways to the atmosphere, adjustable valve means in said air-discharging ports for regulating air flow therethrough, said air discharging ports being situated to register alternately with annular grooves formed in said valve member to provide for the discharge of air to the atmosphere by way of said passageways and from said cylinder on the side of said piston opposed to that receiving energy, means for retaining said valve member against movement when it occupies its extreme operating positions, spring means normally serving to maintain said valve member in one of its extreme operating positions, and means for overcoming the effect of said spring means for moving said valve member to its other extreme operating position.

LAFAYETTE B. SMITH.

REFERENCES CITED

The following references are of record in the file of this patent:

UNITED STATES PATENTS

| Number | Name | Date |
|---|---|---|
| 897,676 | Thompson | Sept. 1, 1908 |
| 1,998,873 | Kingsbury | April 23, 1935 |
| 2,276,435 | Thompson | March 17, 1942 |
| 2,298,457 | Berges | Oct. 13, 1942 |